United States Patent
Tanaka et al.

(10) Patent No.: US 8,237,529 B2
(45) Date of Patent: Aug. 7, 2012

(54) LOW-LOSS FERRITE AND ELECTRONIC DEVICE FORMED BY SUCH FERRITE

(75) Inventors: Satoru Tanaka, Tottori (JP); Takeshi Tachibana, Tottori (JP)

(73) Assignee: Hitachi Metals, Ltd., Tokyo (JP)

( * ) Notice: Subject to any disclaimer, the term of this patent is extended or adjusted under 35 U.S.C. 154(b) by 100 days.

(21) Appl. No.: 12/526,138

(22) PCT Filed: Feb. 6, 2008

(86) PCT No.: PCT/JP2008/051968
§ 371 (c)(1),
(2), (4) Date: Aug. 6, 2009

(87) PCT Pub. No.: WO2008/096795
PCT Pub. Date: Aug. 14, 2008

(65) Prior Publication Data
US 2010/0321140 A1 Dec. 23, 2010

(30) Foreign Application Priority Data
Feb. 7, 2007 (JP) .................. 2007-027727

(51) Int. Cl.
*H01F 17/00* (2006.01)
*H01F 17/04* (2006.01)
*H01G 9/02* (2006.01)
(52) U.S. Cl. .................. 336/105; 336/221; 252/62.2
(58) Field of Classification Search .................. 336/105
See application file for complete search history.

(56) References Cited

U.S. PATENT DOCUMENTS
2002/0198212 A1 12/2002 Swan Wood et al.
2006/0219974 A1* 10/2006 Kato .................. 252/62.63

FOREIGN PATENT DOCUMENTS

| JP | 05-326243 A | 12/1993 |
|---|---|---|
| JP | 06-061033 A | 3/1994 |
| JP | 06-120021 A | 4/1994 |
| JP | 09-007816 A | 1/1997 |
| JP | 10-007454 A | 1/1998 |
| JP | 2002-064972 A | 2/2002 |
| JP | 2002-198212 A | 7/2002 |
| JP | 2002-289421 A | 10/2002 |
| JP | 2003-272912 A | 9/2003 |
| JP | 2006-273608 A | 10/2006 |

OTHER PUBLICATIONS

English Translation of JP 2003-272912.*
Japanese Office Action dated Aug. 5, 2009 in corresponding Japanese Patent Application No. 2008-536667.

* cited by examiner

*Primary Examiner* — Elvin G Enad
*Assistant Examiner* — Ronald Hinson
(74) *Attorney, Agent, or Firm* — Sughrue Mion, PLLC

(57) ABSTRACT

Low-loss ferrite comprising 100% by mass of main components comprising 47.1-49.3% by mol of $Fe_2O_3$, 20-26% by mol of ZnO, and 6-14% by mol of CuO, the balance being NiO, and 0.1-2% by mass (as $SnO_2$) of Sn and 0.05-2% by mass (as $Mn_3O_4$) of Mn, and having an average crystal grain size of 0.5-3 μm.

5 Claims, 5 Drawing Sheets

US 8,237,529 B2

LOW-LOSS FERRITE AND ELECTRONIC DEVICE FORMED BY SUCH FERRITE

CROSS REFERENCE TO RELATED APPLICATIONS

This application is a National Stage of International Application No. PCT/JP2008/051968 filed Feb. 6, 2008, claiming priority based on Japanese Patent Application No. 2007-027727, filed Feb. 7, 2007, the contents of all of which are incorporated herein by reference in their entirety.

FIELD OF THE INVENTION

The present invention relates to low-temperature-sinterable, low-loss ferrite with little variation of characteristics in a wide temperature range even under stress, and an electronic device having inductors formed by such ferrite.

BACKGROUND OF THE INVENTION

Various mobile electronic gears (cell phones, mobile information terminals PDA, note-type personal computers, DVD players, CD players, MD players, digital cameras, digital video cameras, etc.) comprise pluralities of DC/DC converters as power conversion apparatuses for converting the voltage of contained cells to operation voltage. In note-type personal computers, for instance, DC/DC converters are arranged near digital signal processors (DSP), micro processing units (MPU), etc.

As one example of DC/DC converters, FIG. 6 shows a step-down DC-DC converter comprising an input capacitor Cin, an output capacitor Cout, an output inductor Lout, and an integrated circuit semiconductor IC including a switching device and a control circuit as discrete circuits on a printed circuit board. By operating the switching device based on a control signal from the control circuit, output voltage Vout expressed by Vout=Ton/(Ton+Toff)×Vin, wherein Ton is a time period in which the switching device is turned on, and Toff is a time period in which the switching device is turned off, is obtained from DC input voltage Vin. Even with the variation of the input voltage Vin, stable output voltage Vout can be obtained by adjusting a Ton/Toff ratio. An LC circuit comprising an output inductor Lout storing and discharging current energy, and an output capacitor Cout storing and discharging voltage energy acts as a filter circuit (smoothing circuit) for outputting DC voltage.

An output inductor Lout widely used at present, as shown in FIGS. 8 and 9, comprises a conductor wire 230 wound around a magnetic core 220. Used for the magnetic core 220 is high-resistance ferrite such as Ni—Zn ferrite, Ni—Cu—Zn ferrite, etc., so that a conductor wire can be wound directly around it.

The reduction of the operation voltage of LSI (large scale integration) constituting DSP and MPU has recently been accelerated to expand the usable time period of cells. Operation voltage has been lowered to 2.5 V, and further to 1.8 V, for high-speed-operation parts such as MPU and DSP. Because of such decrease of operation voltage, the voltage margin of LSI is reduced relative to the variation (ripple) of the output voltage of DC/DC converters, so that LSI is more influenced by noise. To cope with this, the switching frequencies of DC/DC converters have been increased from conventional 500 kHz to 1 MHz or more to suppress ripple.

Higher switching frequencies reduce inductance required for an output inductor Lout, enabling the size reduction of the inductor and a power supply circuit. However, higher switching frequencies contribute to the reduction of conversion efficiency due to loss generated in switching devices and inductors. Although power loss by inductors is caused predominantly by the DC resistance of conductor lines and output current at low frequencies, AC resistance (AC resistance of conductor lines and core loss of ferrite) is not negligible at high frequencies. Accordingly, to operate DC/DC converters efficiently at high frequencies exceeding 1 MHz, the core loss of ferrite constituting inductors should be reduced. The core loss of ferrite is determined by hysteresis loss, eddy current loss and residual loss. It is known that these losses depend on the magnetic properties (coercivity, saturation magnetization, magnetic domain wall resonance, etc.), crystal grain size, resistivity, etc. of ferrite.

JP 2002-289421 A discloses Ni—Cu—Zn ferrite comprising 46-50% by mol of $Fe_2O_3$, 2-13% by mol of CuO, 24-30.5% by mol of ZnO, and 3.5% by mol or less of $Mn_2O_3$, the balance being NiO, which has a high saturation magnetic flux density and low loss. The addition of $Mn_2O_3$ provides this ferrite with reduced loss at a magnetic flux density of 150 mT and a frequency of 50 kHz. However, this reference does not propose any measures to achieve loss reduction at high frequencies, and to cope with the deterioration of characteristics under stress and the change of characteristics with temperature. Although this reference describes that inevitable impurities including typical metal elements such as B, C, Al, Si, P, S, Cl, As, Se, Br, Te, I, Li, Na, Mg, Al, K, Ca, Ga, Ge, Sr, Cd, In, Sn, Sb, Ba, Tl, Pb, Bi, etc., and transition metal elements such as Sc, Ti, V, Cr, Co, Y, Zr, Nb, Mo, Pd, Ag, Hf, Ta, W, etc. may be contained, it does not discuss the addition of both Mn and Sn as sub-components at all.

Inductors are also required to have stability under stress (little variation of inductance and less increase in loss under stress). Such stress includes stress caused by the difference in a linear thermal expansion coefficient between an inductor and a printed circuit board, stress caused by the deformation of a printed circuit board, stress caused by the curing of a molding resin when an inductor is sealed with a resin, stress caused by shrinkage difference when internal conductors and ferrite are simultaneously sintered to produce a laminated inductor, stress caused by plating external terminals, etc. Also, because DC/DC converters are exposed to heat generated by integrated circuit semiconductors IC, etc., inductors used therein are required to exhibit stable characteristics at use temperatures; little variation of inductance with temperature.

As ferrite having improved stability and temperature characteristics under stress, JP 05-326243 A discloses Ni—Cu—Zn ferrite comprising 100% by mass of main components comprising 46.5-49.5% by mol of $Fe_2O_3$, 5.0-12.0% by mol of CuO, and 2.0-30.0% by mol of ZnO, the balance being NiO, and sub-components comprising 0.05-0.6% by mass of $Co_3O_4$, 0.5-2% by mass of $Bi_2O_3$, and 0.1-2% by mass in total of $SiO_2$ and $SnO_2$. However, this Ni—Cu—Zn ferrite does not contain Mn ($Mn_2O_3$) though it contains $SnO_2$. Accordingly, loss reduction at high frequencies, and the improvement of stability and temperature characteristics under stress by the addition of both Mn and Sn are not achieved. Also, because it contains $Bi_2O_3$ having a melting point of 820° C. in as large an amount as 0.5-2% by mass, crystal growth is accelerated, resulting in a crystal structure having an average crystal grain size of 5 μm or more, and thus large core loss at high frequencies.

OBJECT OF THE INVENTION

Accordingly, an object of the present invention is to provide a low-loss ferrite sinterable at lower temperatures than the melting point of Ag, having low loss at high frequencies of 2 MHz or more, and suffering little variation of characteristics in a wide temperature range even under stress, and an electronic device using such low-loss ferrite.

DISCLOSURE OF THE INVENTION

The low-loss ferrite of the present invention comprises as main components 47.1-49.3% by mol of $Fe_2O_3$, 20-26% by mol of ZnO, and 6-14% by mol of CuO, the balance being NiO, and 0.1-2% by mass (as $SnO_2$) of Sn and 0.05-2% by mass (as $Mn_3O_4$) of Mn based on 100% by mass of the main components, and having an average crystal grain size of 0.5-3 μm.

The low-loss ferrite of the present invention preferably has core loss of 2700 kW/m³ or less at a frequency of 2 MHz and at an operating magnetic flux density Bm of 33 mT, and 430 kW/m³ or less at a frequency of 5 MHz and at an operating magnetic flux density Bm of 10 mT, and saturation magnetic flux density Bs of 390 mT or more in a magnetic field of 4000 μm.

The first electronic device of the present invention comprises a magnetic core made of the above low-loss ferrite, and at least one coil wound around the magnetic core.

The second electronic device of the present invention comprises an integrally sintered laminate comprising pluralities of ferrite layers made of the above low-loss ferrite, and at least one coil formed by Ag-containing electrodes in the laminate. In this electronic device, a semiconductor device including at least one switch device, at least one capacitor and at least one resistance device preferably are mounted, at least the semiconductor device being mounted on an electrode on the surface of the laminate.

DESCRIPTION OF THE PREFERRED EMBODIMENTS

Figure 1:
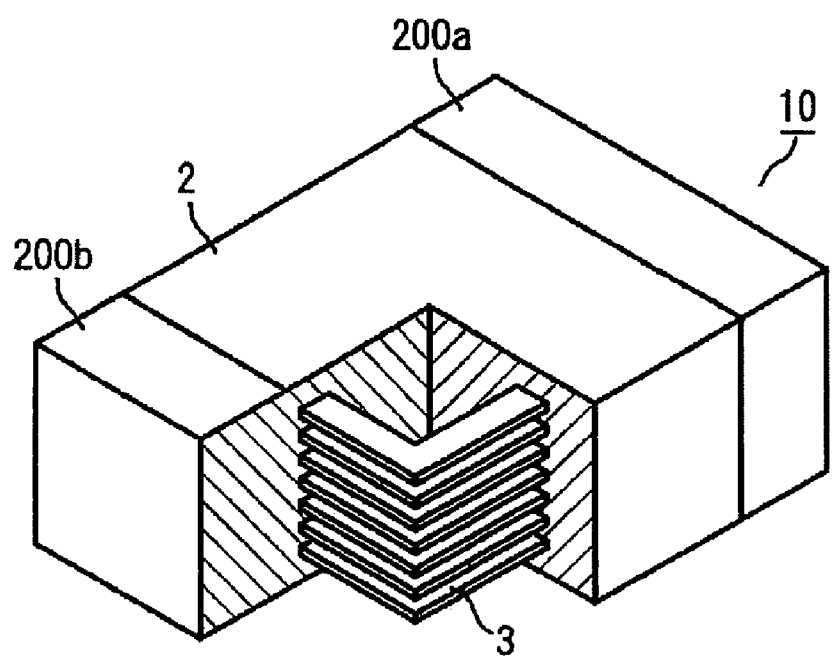
FIG. 1 is a perspective view showing a laminated inductor using the low-loss ferrite of the present invention.

[1] Low-Loss Ferrite (A) Composition
(1) Main Components

The low-loss ferrite of the present invention (Ni—Cu—Zn ferrite) comprises as main components 47.1-49.3% by mol of $Fe_2O_3$, 20-26% by mol of ZnO, and 6-14% by mol of CuO, the balance being NiO.

When $Fe_2O_3$ is less than 47.1% by mol, the ferrite has large core loss Pcv at 2 MHz and 5 MHz, and does not have sufficient permeability. When $Fe_2O_3$ is more than 49.3% by mol, the ferrite is not sufficiently sintered at a temperature equal to or lower than 960° C., the melting point of Ag, and has poor magnetic properties and low mechanical strength. $Fe_2O_3$ is preferably 47.5-49.0% by mol.

When ZnO is less than 20% by mol, the ferrite has large core loss at a frequency of 2 MHz and an operating magnetic flux density of 33 mT, and low permeability. When ZnO is more than 26% by mol, the ferrite has large core loss at a frequency of 5 MHz and an operating magnetic flux density of 10 mT. ZnO is preferably 21-26% by mol.

When CuO is less than 6% by mol or more than 14% by mol, the ferrite has a low saturation magnetic flux density Bs of less than 390 mT. Decrease in the saturation magnetic flux density Bs undesirably results in the deterioration of DC superimposition characteristics. When CuO contributing to lowering sintering temperatures is less than 6% by mol, the ferrite is likely to have an insufficient sintering density. CuO is preferably 7-11% by mol.

The amount of NiO is the balance of main components. To obtain the desired permeability and a high saturation magnetic flux density Bs, a molar ratio of NiO/CuO is preferably 1.0-3.1.

(2) Sub-Components

The low-loss ferrite of the present invention comprises 0.1-2% by mass (as $SnO_2$) of Sn, and 0.05-2% by mass (as $Mn_3O_4$) of Mn as sub-components, per 100% by mass of the main components.

The addition of Sn provides the ferrite with decreased saturation magnetic flux density Bs and increased coercivity Hc. Sn is dissolved in crystal grains as stable tetravalent ions to reduce lattice strain, thereby reducing a saturation magnetostriction constant λs and a magnetic anisotropy constant K1, and thus suppressing inductance change and core loss increase due to stress. As the temperature elevates, the saturation magnetic flux density Bs and the magnetic anisotropy constant K1 decrease, but the addition of 2% by mass or less (as $SnO_2$) of Sn makes it possible to adjust the saturation magnetic flux density Bs and the magnetic anisotropy constant K1 at use temperatures, thereby reducing the change of initial permeability μi with temperatures. When $SnO_2$ is more than 2% by mass, part of it enters grain boundaries to hinder sintering, so that the sintering density does not increase at 960° C. or lower, resulting in deteriorated magnetic properties such as permeability, etc. It is thus undesirable for a laminate device integrally sintered with Ag electrodes, etc. When $SnO_2$ is less than 0.05% by mass, sufficient effect of adding $SnO_2$ cannot be obtained. The preferred amount of Sn is 0.25-2% by mass as $SnO_2$.

The low-loss ferrite of the present invention contains 0.05-2% by mass (as $Mn_3O_4$) of Mn. The addition of Mn reduces lattice strain, increases initial permeability μi, improves the linearity of a BH loop, and reduces coercivity Hc in a minor loop and hysteresis loss. Because Mn suppresses the movement of electrons between $Fe^{3+}$ and $Fe^{2+}$, it increases resistivity ρ and reduces eddy current loss. However, the addition of $Mn_3O_4$ tends to deteriorate the stress characteristics of core loss Pcv and inductance. Accordingly, the amount of $Mn_3O_4$ is preferably 0.1-1.5% by mass.

The valency of Mn added partially changes, obviating decrease in the initial permeability μi and increase in the coercivity Hc due to the addition of Sn. Accordingly, the addition of both Sn and Mn provides ferrite with excellent stability under stress and remarkably reduced loss.

(3) Other Components

The low-loss ferrite of the present invention may further contain 1.5% by mass or less (as CaO) of Ca, and 1.5% by mass or less (as $SiO_2$) of Si. They suppress the growth of crystal grains, resulting in decreased permeability and increased resistivity. To alleviate the reduction of sinterability by the addition of Sn, 0.3% by mass or less (as $Bi_2O_3$) of Bi may be added.

The amounts of inevitable impurities contained in the ferrite-forming materials, such as Na, S, Cl, P, W, B, etc., are preferably as small as possible, and their industrially permitted ranges are 0.05% by mass or less in total. Particularly less than 5 ppm of Cl and less than 8 ppm of P are advantageous for low loss.

The amounts of the main components and the sub-components are determined by fluorescent X-ray analysis and ICP atomic emission spectroscopy. Elements contained are first qualitatively analyzed by fluorescent X-ray, and then quantitatively analyzed by a calibration method comparing with a standard sample.

(B) Structure and Properties

The low-loss ferrite of the present invention has an average crystal grain size of 0.5-3 μm. The average crystal grain size of 3 μm or less reduces eddy current loss, residual loss because of decrease in magnetic domain walls, and core loss at high frequencies. However, when the average crystal grain size is less than 0.5 μm, grain boundaries act as pinning points of magnetic domain walls, resulting in decrease in permeability and increase in core loss. When the average crystal grain size is more than 3 μm, the eddy current loss and the residual loss have large influence, resulting in remarkable increase in loss at high frequencies (for instance, 5 MHz).

To obtain the average crystal grain size of 3 μm or less, the calcined ferrite powder to be sintered preferably has a BET specific surface area of 5-10 $m^2/g$. Because a larger BET specific surface area provides larger reactivity, densification is accelerated from low sintering temperatures. When the BET specific surface area of the calcined ferrite powder is 5-10 $m^2/g$, dense ferrite having a small and uniform crystal grain size is obtained even at as low sintering temperatures as 960° C. or lower.

When the BET specific surface area of the calcined ferrite powder is less than 5 $m^2/g$, the sintered ferrite may have an average crystal grain size of more than 3 μm. When the BET specific surface area is more than 10 $m^2/g$, the calcined ferrite powder easily aggregates and adsorbs water, so that calcined ferrite powder slurry containing a water-soluble resin such as polyvinyl butyral as a binder easily has an aggregated structure, providing green sheets with a lot of pores, which serve as paths for water to intrude into the electronic device. The preferred BET specific surface area of the calcined ferrite powder is 5.5-8 $m^2/g$.

The initial permeability μi of ferrite is parallel to $Bs^2/(aK1+b\lambda s\sigma)$, wherein Bs represents a saturation magnetic flux density, K1 represents a magnetic anisotropy constant, λs represents a magnetostriction constant, σ represents stress, and a and b represent constants. Because Ni—Cu—Zn ferrite has a negative magnetostriction constant, the initial permeability μi increases to the maximum and then decreases with compression stress. When an inductor is provided with a magnetic gap in its magnetic circuit to improve its DC superimposition characteristics, its effective permeability is reduced. Accordingly, the permeability of the ferrite is preferably 150 or more.

[2] Electronic Device

FIG. 1 shows a laminated inductor containing a coil (inductor), as an electronic device using the low-loss ferrite of the present invention. This laminated inductor 10 can be produced by forming green sheets of low-loss ferrite by a doctor blade method, etc., forming a coil pattern 3 on each sheet with a conductor paste of Ag or its alloy, etc., further printing a ferrite paste and a non-magnetic paste, if necessary, laminating the green sheets, integrally sintering them, and forming external terminals 200a, 200b on the side surfaces of a laminate 2 on which the conductor patterns are exposed.

Figure 7:
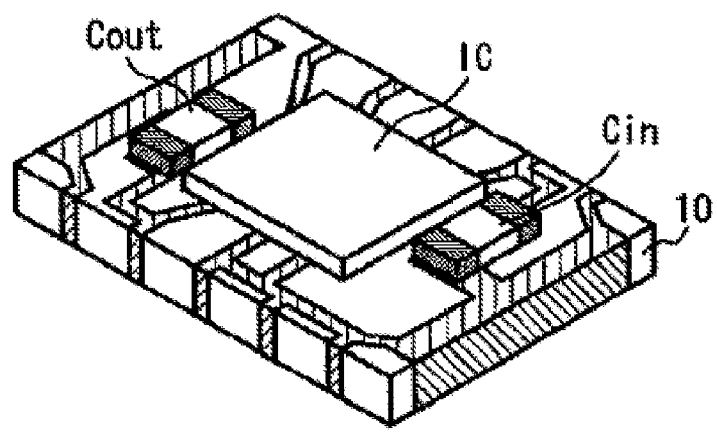
FIG. 7 is a perspective view showing a DC/DC converter using the low-loss ferrite of the present invention.
Figure 8:
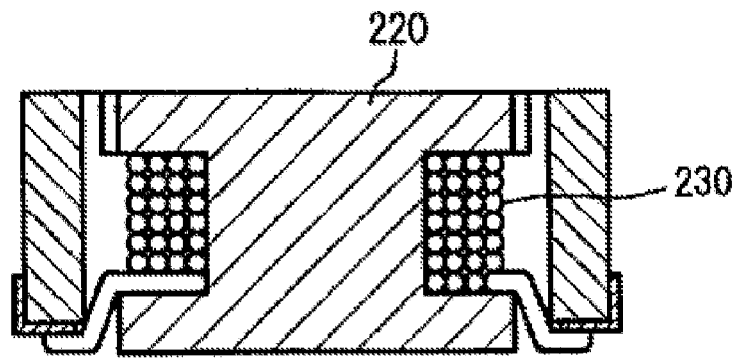
FIG. 8 is a cross-sectional view showing one example of inductors comprising a ferrite magnetic core.
Figure 9:
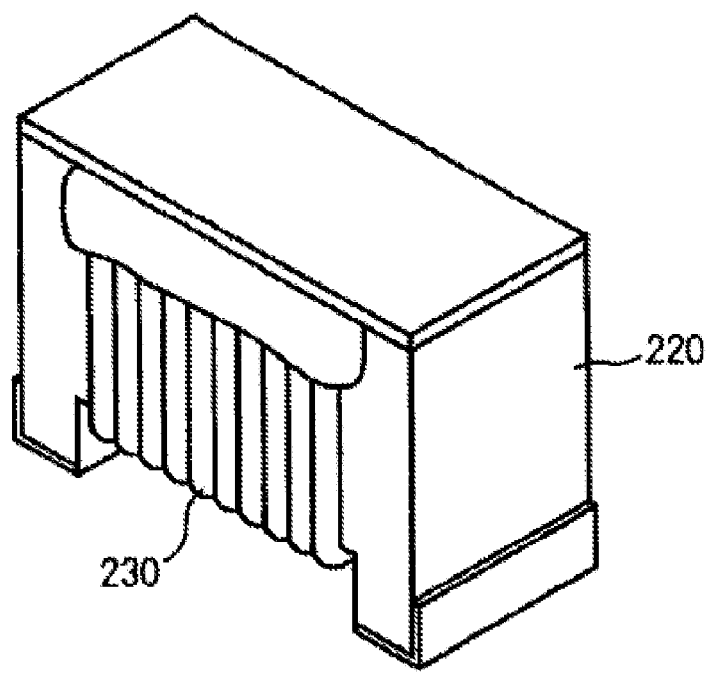
FIG. 9 is a perspective view showing the inductor of FIG. 8.

As another example of the electronic devices, FIG. 7 shows a DC/DC converter module comprising an integrated-circuit semiconductor IC and capacitors Cin, Cout mounted on the surface electrodes of an inductor-containing laminate substrate 10 to have electric connection to the inductor. Alternatively, an inductor and an integrated-circuit semiconductor IC may be mounted on a capacitor-containing laminate substrate to constitute a module. Apart from them, various modifications may, of course, be added unless they deviate from the scope of the present invention.

The present invention will be explained in further detail by Examples below without intention of restricting the present invention thereto.

EXAMPLE 1

The main components of $Fe_2O_3$, ZnO, CuO and NiO, and the sub-components of $SnO_2$ and $Mn_3O_4$ were wet-mixed at proportions shown in Tables 1 and 2, dried, and then calcined at 800° C. for 2 hours. The resultant the calcined powder was charged into a ball mill together with ion-exchanged water, and pulverized for about 20 hours until its BET specific surface area became 6.5 $m^2/g$. Each calcined powder was mixed with polyvinyl alcohol, granulated by a spray-drying method, molded, and sintered at a temperature in a range of 875-950° C. shown in Tables 1 and 2 for 2 hours in the air, to obtain ring samples of 8 mm in outer diameter, 4 mm in inner diameter and 2 mm in thickness, and squarely annular samples of 8 mm×8 mm in outer size, 4 mm×4 mm in inner size, and 2 mm in thickness.

TABLE 1

| No. | Main Components (mol %) | | | | Sub-Components (% by mass) | | | Sintering Temperature (° C.) |
|---|---|---|---|---|---|---|---|---|
| | $Fe_2O_3$ | ZnO | NiO | CuO | $SnO_2$ | $Mn_3O_4$ | $Bi_2O_3$ | |
| *1 | 47.0 | 23.9 | 20.3 | 8.8 | 0.50 | 0.10 | — | 900 |
| 2 | 47.5 | 23.9 | 19.8 | 8.8 | 0.50 | 0.10 | — | 900 |
| 3 | 47.5 | 23.9 | 19.8 | 8.8 | 0.50 | 0.10 | 0.25 | 875 |
| 4 | 47.5 | 23.9 | 19.8 | 8.8 | 0.50 | 0.10 | 0.25 | 900 |
| *5 | 47.5 | 23.9 | 19.8 | 8.8 | 0.50 | 0.10 | 0.5 | 875 |
| *6 | 47.5 | 23.9 | 19.8 | 8.8 | 0.50 | 0.10 | 0.5 | 900 |
| 7 | 48.0 | 23.9 | 19.3 | 8.8 | 0.50 | 0.10 | — | 900 |

TABLE 1-continued

| No. | Main Components (mol %) | | | | Sub-Components (% by mass) | | | Sintering Temperature (° C.) |
|---|---|---|---|---|---|---|---|---|
| | Fe$_2$O$_3$ | ZnO | NiO | CuO | SnO$_2$ | Mn$_3$O$_4$ | Bi$_2$O$_3$ | |
| 8 | 48.5 | 23.9 | 18.8 | 8.8 | 0.50 | 0.10 | — | 900 |
| 9 | 49.0 | 23.9 | 18.3 | 8.8 | 0.50 | 0.10 | — | 900 |
| *10 | 49.5 | 23.9 | 17.8 | 8.8 | 0.50 | 0.10 | — | 900 |
| *11 | 48.0 | 21.0 | 18.0 | 13.0 | — | — | — | 900 |
| *12 | 47.5 | 23.9 | 19.8 | 8.8 | — | — | 0.5 | 900 |
| *13 | 49.0 | 21.0 | 17.0 | 13.0 | — | 0.10 | — | 900 |
| *14 | 48.5 | 19.0 | 23.7 | 8.8 | 0.50 | 0.10 | — | 900 |
| 15 | 48.5 | 21.0 | 21.7 | 8.8 | 0.50 | 0.10 | — | 900 |
| 16 | 48.5 | 22.0 | 20.7 | 8.8 | 0.50 | 0.10 | — | 900 |
| 17 | 48.5 | 23.0 | 19.7 | 8.8 | 0.50 | 0.10 | — | 900 |
| 18 | 48.5 | 23.9 | 18.8 | 8.8 | 0.50 | 0.10 | — | 900 |
| 19 | 48.5 | 25.0 | 17.7 | 8.8 | 0.50 | 0.10 | — | 900 |
| 20 | 48.5 | 25.0 | 17.7 | 8.8 | 0.50 | 0.10 | 0.3 | 875 |
| 21 | 48.5 | 26.0 | 16.7 | 8.8 | 0.50 | 0.10 | — | 900 |
| *22 | 48.5 | 28.0 | 14.7 | 8.8 | 0.50 | 0.10 | — | 900 |
| *23 | 48.5 | 29.0 | 11.5 | 11.0 | 0.50 | 0.10 | — | 900 |
| *24 | 48.5 | 30.0 | 12.5 | 9.0 | 0.50 | 0.10 | — | 900 |
| *25 | 48.5 | 31.0 | 11.7 | 8.8 | 0.50 | 0.10 | — | 900 |

TABLE 2

| No. | Main Components (mol %) | | | | Sub-Components (% by mass) | | | Sintering Temperature (° C.) |
|---|---|---|---|---|---|---|---|---|
| | Fe$_2$O$_3$ | ZnO | NiO | CuO | SnO$_2$ | Mn$_3$O$_4$ | Bi$_2$O$_3$ | |
| 26 | 48.7 | 25.0 | 17.5 | 8.8 | 0.50 | 0.10 | — | 900 |
| 27 | 48.9 | 25.0 | 17.3 | 8.8 | 0.50 | 0.10 | — | 900 |
| 28 | 49.3 | 25.0 | 16.9 | 8.8 | 0.50 | 0.10 | — | 950 |
| *29 | 49.5 | 25.0 | 16.7 | 8.8 | 0.50 | 0.10 | — | 950 |
| *30 | 47.5 | 23.9 | 23.6 | 5.0 | 0.50 | 0.10 | — | 900 |
| 31 | 47.5 | 23.9 | 21.6 | 7.0 | 0.50 | 0.10 | — | 900 |
| 32 | 47.5 | 23.9 | 19.6 | 9.0 | 0.50 | 0.10 | — | 900 |
| 33 | 47.5 | 23.9 | 17.6 | 11.0 | 0.50 | 0.10 | — | 900 |
| 34 | 47.5 | 23.9 | 15.6 | 13.0 | 0.50 | 0.10 | — | 900 |
| *35 | 47.5 | 23.9 | 13.6 | 15.0 | 0.50 | 0.10 | — | 900 |
| *36 | 47.5 | 23.9 | 19.8 | 8.8 | — | 0.10 | — | 900 |
| 37 | 47.5 | 23.9 | 19.8 | 8.8 | 0.25 | 0.10 | — | 900 |
| 38 | 47.5 | 23.9 | 19.8 | 8.8 | 0.75 | 0.10 | — | 900 |
| 39 | 47.5 | 23.9 | 19.8 | 8.8 | 1.00 | 0.10 | — | 900 |
| *40 | 47.5 | 23.9 | 19.8 | 8.8 | 3.00 | 0.10 | — | 900 |
| *41 | 47.5 | 23.9 | 19.8 | 8.8 | 0.50 | — | — | 900 |
| 42 | 47.5 | 23.9 | 19.8 | 8.8 | 0.50 | 0.35 | — | 900 |
| 43 | 47.5 | 23.9 | 19.8 | 8.8 | 0.50 | 0.60 | — | 875 |
| 44 | 47.5 | 23.9 | 19.8 | 8.8 | 0.50 | 0.60 | — | 900 |
| 45 | 47.5 | 23.9 | 19.8 | 8.8 | 0.50 | 0.60 | — | 925 |
| 46 | 47.5 | 23.9 | 19.8 | 8.8 | 0.50 | 0.85 | — | 900 |
| 47 | 47.5 | 23.9 | 19.8 | 8.8 | 0.50 | 1.10 | — | 900 |
| *48 | 47.5 | 23.9 | 19.8 | 8.8 | 0.50 | 2.10 | — | 900 |

Note:
*Samples outside the scope of the present invention.

The density, average crystal grain size, initial permeability μi, saturation magnetic flux density Bs, residual magnetic flux density Br, coercivity Hc, resistivity, core loss Pcv, and relative temperature coefficient αμir of initial permeability μi of each sample were measured by the following methods. The measurement results are shown in Tables 3 and 4.

(1) Density

The density was calculated from the size and weight of a ring sample.

(2) Average Crystal Grain Size

A straight line having an arbitrary length $L_1$ was drawn on an electron photomicrograph (magnification: 10,000 times) of a ring sample to count the number $N_1$ of particles existing on this straight line, and the length $L_1$ was divided by the number of $N_1$ particles to calculate $L_1/N_1$. The values of $L_1/N_1$ obtained on pluralities of straight lines were averaged to determine the average crystal grain size.

(3) Initial Permeability μi

A copper wire was wound around a ring sample by 7 turns to produce an inductor, whose inductance L was measured by an LCR meter at a frequency of 1 MHz and current of 1 mA, to calculate initial permeability μi by the following formula:

$$\mu i = (le \times L)/(\mu_0 \times Ae \times N^2),$$

wherein le represents the length of a magnetic path, L represents inductance, $\mu_0$ represents the permeability of vacuum, which is $4\pi \times 10^{-7}$ (H/m), Ae represents the cross section area of a sample, and N represents the number of turns of a coil.

(4) Relative Temperature Coefficient αμir of Initial Permeability μi

The relative temperature coefficient αμir of initial permeability μi is expressed by the following formula:

$$\alpha\mu ir = [(\mu i_2 - \mu i_1)/\mu i_1^2]/(T_2 - T_1),$$

wherein $T_1$ and $T_2$ represent measurement temperatures, $\mu i_1$ represents initial permeability at the temperature $T_1$, and $\mu i_2$ represents initial permeability at the temperature $T_2$.

Initial permeability μi was measured with respect to each sample adjusted to −40° C. to +80° C. in an electronic constant-temperature chamber. In the case of a relative temperature coefficient αμir from −40° C. to +20° C., $T_1$=+20° C., and $T_2$=−40° C., $\mu i_1$ represents initial permeability at +20° C., and $\mu i_2$ represents initial permeability at −40° C. In the case of relative temperature coefficient αμir from +20° C. to +80° C., $T_1$=+20° C., $T_2$=80° C., $\mu i_1$ represents initial permeability at +20° C., and $\mu i_2$ represents initial permeability at +80° C.

(5) Saturation Magnetic Flux Density Bs

A major loop of the hysteresis of each ring sample was measured by a B-H analyzer in a magnetic field of 4000 A/m and a frequency of 10 kHz. The saturation magnetic flux density Bs was determined from this hysteresis loop.

(6) Residual Magnetic Flux Density Br

The residual magnetic flux density Br was determined from the above hysteresis loop.

(7) Coercivity Hc

The coercivity Hc was determined from the above hysteresis loop.

(8) Resistivity

The ring sample was cut to half to obtain a test piece, whose cut surface was coated with a conductive resin and dried, and the resistivity of the test piece was measured by an insulation resistance meter at DC voltage of 50 V.

(9) Core Loss Pcv

Copper wires were wound around a ring sample by 7 turns on both primary and secondary sides, to measure Pcv at room temperature (25° C.) under the conditions of 100 kHz and 50 mT, 2 MHz and 33 mT, and 5 MHz and 10 mT, respectively.

TABLE 3

| No. | Density (g/cm³) | Dav[1] (μm) | μi[2] | Bs[3] (mT) | Br[4] (mT) | Hc[5] (A/m) |
|---|---|---|---|---|---|---|
| *1 | 5.2 | 0.8 | 165 | 404 | 217 | 330 |
| 2 | 5.3 | 0.9 | 221 | 413 | 247 | 280 |
| 3 | 5.2 | 1.2 | 191 | 407 | 207 | 280 |
| 4 | 5.3 | 1.4 | 204 | 423 | 207 | 269 |
| *5 | 5.2 | Abnormal Sintering | 216 | 414 | 213 | 201 |
| *6 | 5.2 | Abnormal Sintering | 262 | 424 | 182 | 131 |
| 7 | 5.2 | 0.9 | 218 | 411 | 252 | 272 |
| 8 | 5.2 | 1.1 | 235 | 416 | 259 | 251 |
| 9 | 5.2 | 1.0 | 250 | 422 | 272 | 236 |
| *10 | 4.6 | 0.4 | 95 | 325 | 222 | 508 |
| *11 | 5.3 | — | 239 | 436 | 289 | 243 |
| *12 | 5.3 | 15.0 | 306 | 436 | 229 | 113 |
| *13 | 5.3 | 1.9 | 297 | 448 | 303 | 183 |
| *14 | 5.1 | 1.0 | 152 | 417 | 268 | 331 |
| 15 | 5.1 | 1.0 | 181 | 420 | 266 | 293 |
| 16 | 5.2 | 1.1 | 195 | 423 | 269 | 297 |
| 17 | 5.2 | 0.9 | 213 | 419 | 263 | 276 |
| 18 | 5.2 | 1.1 | 235 | 416 | 259 | 251 |
| 19 | 5.2 | 1.2 | 279 | 409 | 241 | 213 |
| 20 | 5.2 | 0.9 | 229 | 408 | 232 | 253 |
| 21 | 5.2 | 1.3 | 297 | 406 | 238 | 199 |
| *22 | 5.2 | 1.2 | 340 | 381 | 213 | 167 |
| *23 | 5.3 | — | 383 | 351 | 197 | 140 |
| *24 | 5.3 | — | 385 | 334 | 178 | 132 |
| *25 | 5.3 | 1.4 | 411 | 310 | 162 | 114 |

TABLE 3-continued

| No. | Resistivity (Ω·m) | Pcv[6] (kW/m³) 100 kHz, 50 mT | Pcv[6] (kW/m³) 2 MHz, 33 mT | Pcv[6] (kW/m³) 5 MHz, 10 mT | αμir[7] (ppm) −40° C. to +20° C. | αμir[7] (ppm) +20° C. to +80° C. |
|---|---|---|---|---|---|---|
| *1 | 1.2 × 10⁵ | 282 | 2874 | 444 | 2.7 | 0.2 |
| 2 | 1.9 × 10⁵ | 221 | 2294 | 406 | 6.8 | 4.6 |
| 3 | 3.5 × 10⁵ | 243 | 2500 | 387 | — | — |
| 4 | 2.6 × 10⁵ | 209 | 2193 | 360 | — | — |
| *5 | 2.4 × 10⁵ | 358 | 4073 | 894 | — | — |
| *6 | 1.3 × 10⁵ | 305 | 4253 | 1220 | — | — |
| 7 | 6.5 × 10⁵ | 223 | 2387 | 366 | 6.2 | 4.9 |
| 8 | 2.2 × 10⁶ | 206 | 2303 | 371 | 5.6 | 4.6 |
| 9 | 1.6 × 10⁷ | 196 | 2236 | 380 | 4.7 | 4.5 |
| *10 | 4.2 × 10⁷ | 577 | 5179 | 661 | 0.8 | −1.4 |
| *11 | — | — | 2905 | 462 | — | — |
| *12 | 1.1 × 10⁵ | — | 4002 | 1348 | — | — |
| *13 | — | 256 | 2807 | 420 | 7.5 | 9.4 |
| *14 | — | — | 3091 | 369 | 5.0 | 5.6 |
| 15 | — | — | 2671 | 356 | 4.0 | 4.2 |
| 16 | — | 256 | 2661 | 344 | 6.0 | 5.0 |
| 17 | — | 231 | 2425 | 330 | — | — |
| 18 | 2.2 × 10⁸ | 206 | 2303 | 335 | 5.6 | 4.6 |
| 19 | — | 166 | 2062 | 371 | 3.6 | 2.7 |
| 20 | — | 197 | 2181 | 315 | — | — |
| 21 | — | 156 | 2425 | 427 | 2.0 | 1.1 |
| *22 | — | 134 | 2009 | 587 | 0.8 | 0.3 |
| *23 | — | 126 | 1781 | 737 | 0.7 | 0.9 |
| *24 | — | 128 | 1906 | 893 | 0.2 | 0.5 |
| *25 | — | 136 | 1826 | 1034 | −0.1 | 1.1 |

TABLE 4

| No. | Density (g/cm³) | Dav[1] (μm) | μi[2] | Bs[3] (mT) | Br[4] (mT) | Hc[5] (A/m) |
|---|---|---|---|---|---|---|
| 26 | 5.2 | — | 286 | 416 | 253 | 210 |
| 27 | 5.1 | 1.1 | 271 | 405 | 249 | 212 |
| 28 | 5.1 | 1.1 | 216 | 397 | 281 | 232 |
| *29 | 4.9 | 1.0 | 145 | 365 | 262 | 316 |
| *30 | 5.1 | 0.6 | 158 | 374 | 235 | 476 |
| 31 | 5.2 | 0.9 | 172 | 410 | 223 | 329 |
| 32 | 5.2 | 0.9 | 199 | 401 | 235 | 291 |
| 33 | 5.2 | 1.1 | 212 | 400 | 240 | 281 |
| 34 | 5.2 | 1.0 | 217 | 399 | 243 | 282 |
| *35 | 5.1 | 1.0 | 202 | 382 | 238 | 291 |
| *36 | 5.2 | 1.1 | 250 | 427 | 257 | 198 |
| 37 | 5.3 | 1.0 | 243 | 422 | 257 | 223 |
| 38 | 5.3 | 1.1 | 190 | 412 | 239 | 318 |
| 39 | 5.3 | 0.9 | 166 | 401 | 230 | 361 |
| *40 | 4.5 | 0.4 | 49 | 249 | 136 | 827 |
| *41 | 5.3 | 0.9 | 215 | 415 | — | — |
| 42 | 5.3 | 1.2 | 241 | 416 | 244 | 247 |
| 43 | 5.2 | 0.6 | 176 | 393 | 255 | 304 |
| 44 | 5.3 | 1.0 | 242 | 412 | 245 | 235 |
| 45 | 5.3 | 2.6 | 275 | 425 | 242 | 201 |
| 46 | 5.2 | 1.2 | 246 | 412 | 248 | 224 |
| 47 | 5.3 | 1.1 | 251 | 418 | 253 | 211 |
| *48 | 5.3 | 1.9 | 262 | 420 | 280 | 177 |

| No. | Resistivity (Ω·m) | Pcv[6] (kW/m³) 100 kHz, 50 mT | Pcv[6] (kW/m³) 2 MHz, 33 mT | Pcv[6] (kW/m³) 5 MHz, 10 mT | αμir[7] (ppm) −40° C. to +20° C. | αμir[7] (ppm) +20° C. to +80° C. |
|---|---|---|---|---|---|---|
| 26 | — | 168 | 2019 | 400 | — | — |
| 27 | — | 185 | 2249 | 414 | — | — |
| 28 | — | 314 | 2684 | 347 | — | — |
| *29 | — | 458 | 3958 | 500 | — | — |
| *30 | 5.8 × 10⁴ | 294 | 2881 | 422 | 6.1 | 3.4 |
| 31 | 1.0 × 10⁵ | 257 | 2577 | 401 | 2.7 | −0.2 |
| 32 | 3.0 × 10⁵ | 248 | 2550 | 399 | 5.8 | 3.7 |
| 33 | 4.8 × 10⁶ | 211 | 2372 | 384 | 3.3 | 2.5 |
| 34 | 7.2 × 10⁸ | 213 | 2349 | 390 | 1.0 | 1.3 |
| *35 | 1.1 × 10⁷ | 234 | 2499 | 406 | 2.8 | 2.4 |
| *36 | 1.3 × 10⁵ | 259 | 2965 | 535 | 10.7 | 8.3 |
| 37 | 1.4 × 10⁵ | 230 | 2607 | 425 | 9.2 | 6.7 |

TABLE 4-continued

| 38 | $2.6 \times 10^5$ | 221 | 2371 | 364 | 4.2 | 2 |
|---|---|---|---|---|---|---|
| 39 | $3.9 \times 10^5$ | 255 | 2258 | 364 | 2.5 | 0.8 |
| *40 | $1.9 \times 10^7$ | 945 | 6912 | 526 | −12.3 | −12.1 |
| *41 | — | — | 2719 | 434 | 6.4 | 3.2 |
| 42 | $7.9 \times 10^7$ | 182 | 2149 | 381 | 3.2 | 2.2 |
| 43 | — | 271 | 2689 | 319 | — | — |
| 44 | $3.9 \times 10^8$ | 174 | 2084 | 350 | 5.1 | 3.8 |
| 45 | — | 153 | 1869 | 379 | — | — |
| 46 | $2.0 \times 10^8$ | 177 | 2007 | 328 | 7 | 5.3 |
| 47 | $9.0 \times 10^7$ | 169 | 1891 | 287 | 8.5 | 6.8 |
| *48 | $6.0 \times 10^6$ | 199 | 1829 | 244 | 14.6 | 15.2 |

Note:
[1] Average crystal grain size (μm).
[2] Initial permeability μi.
[3] Saturation magnetic flux density Bs (mT).
[4] Residual magnetic flux density Br (mT).
[5] Coercivity Hc (A/m).
[6] Core loss Pcv (kW/m$^3$).
[7] Relative temperature coefficient αμir of initial permeability μi.

Sample 1 comprising 47% by mol of $Fe_2O_3$ had large coercivity Hc and core loss Pcv, and Sample 10 comprising 49.5% by mol of $Fe_2O_3$ had a low sintering density and extremely large core loss Pcv, extremely poor magnetic properties. Sample 11 containing no sub-component had large core loss Pcv at high frequencies. Sample 12 containing $Bi_2O_3$ in place of the sub-component had a large average crystal grain size, and extremely poor core loss Pcv. Samples 5 and 6 containing 0.5% by mass of $Bi_2O_3$ together with Sn and Mn were in an abnormally sintered state having a crystal structure comprising both crystal grains of about 30 μm and crystal grains of about 1 μm in particle size, and had extremely poor core loss Pcv at 5 MHz.

When the amount of ZnO increased while the amount of NiO decreased, the saturation magnetic flux density Bs, the residual magnetic flux density Br and the coercivity Hc decreased, while the initial permeability μi increased. At 2 MHz, increase in ZnO resulted in decrease in core loss Pcv, but at 5 MHz, Sample 17 containing 23% by mol of ZnO had small core loss Pcv, which increased regardless of whether the amount of ZnO increased or decreased.

The substitution of part of Ni with a small amount of Cu provided poor sinterability, decreased initial permeability μi and saturation magnetic flux density Bs, and increased coercivity Hc and core loss Pcv. Alternatively, a large amount of Cu provided a low saturation magnetic flux density Bs.

Sample 36 containing no Sn had large core loss Pcv, and Sample 40 containing 3.0% by mass of Sn suffered insufficient sintering, having extremely poor magnetic properties and large core loss. Increase in the amount of SnO reduced the relative temperature coefficient αμir, and when the amount of SnO exceeded 1% by mass, the relative temperature coefficient αμir became negative. It is thus clear that a proper amount of SnO reduces the change of inductance with temperature. The addition of Mn reduced core loss Pcv, and increased resistivity. The relative temperature coefficient αμir increased along with the amount of Mn added, contrary to the addition of Sn.

A copper wire was wound by 12 turns around each of rectangularly annular Samples 2, 13, 36, 37, 39, 44, 47 and 48, and each Sample was attached to a pressure jig equipped with a tensiometer. A compression force was applied to each Sample in one direction at room temperature, to continuously measure inductance at a frequency of 1 MHz and current of 1 mA, and core loss at a frequency of 2 MHz and an operating magnetic flux density Bm of 33 mT. The change ratios of inductance and core loss were calculated from them by the following formulae, to evaluate the stability of each Sample under stress. The results are shown in FIGS. 2-5.

(1) Change Ratio of Inductance $$(L_1 - L_0)/L_0 \times 100 (\%),$$

wherein $L_1$ represents inductance when compressed in one direction, and $L_0$ represents inductance when not compressed in one direction.

(2) Change Ratio of Core Loss $$(Pcv_1 - Pcv_0)/Pcv_0 \times 100 (\%),$$

wherein $Pcv_1$ represents core loss at 2 MHz and 33 mT when compressed in one direction, and $Pcv_0$ represents core loss at 2 MHz and 33 mT when not compressed in one direction.

Figure 2:
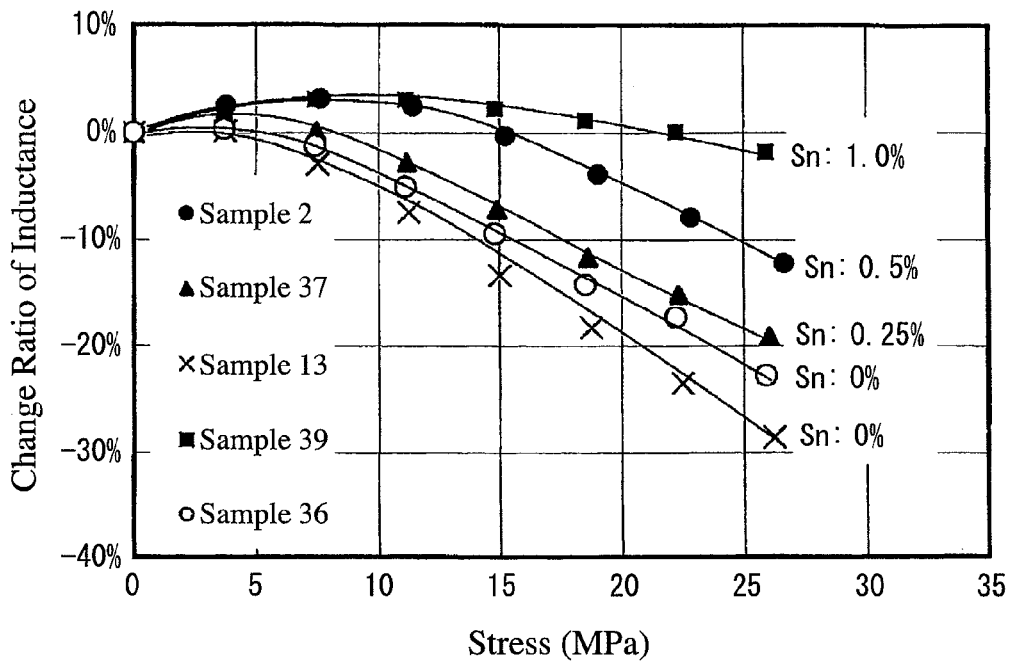
FIG. 2 is a graph showing the change ratio of inductance under stress in low-loss ferrite samples having different Sn contents.
Figure 3:
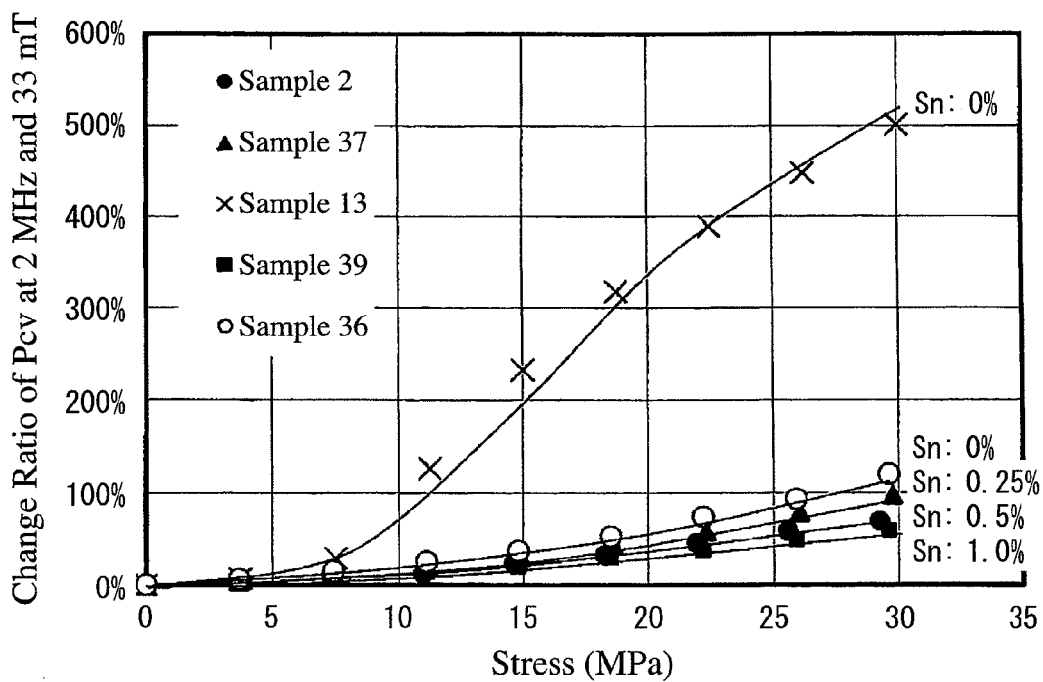
FIG. 3 is a graph showing the change ratio of core loss under stress in low-loss ferrite samples having different Sn contents.

With respect to Samples 2, 13, 36, 37 and 39 containing different amounts of Sn, FIG. 2 shows the stability of inductance under stress, and FIG. 3 shows the stability of core loss under stress. As the amount of Sn increased, the change ratios of inductance and core loss under stress decreased.

Figure 4:
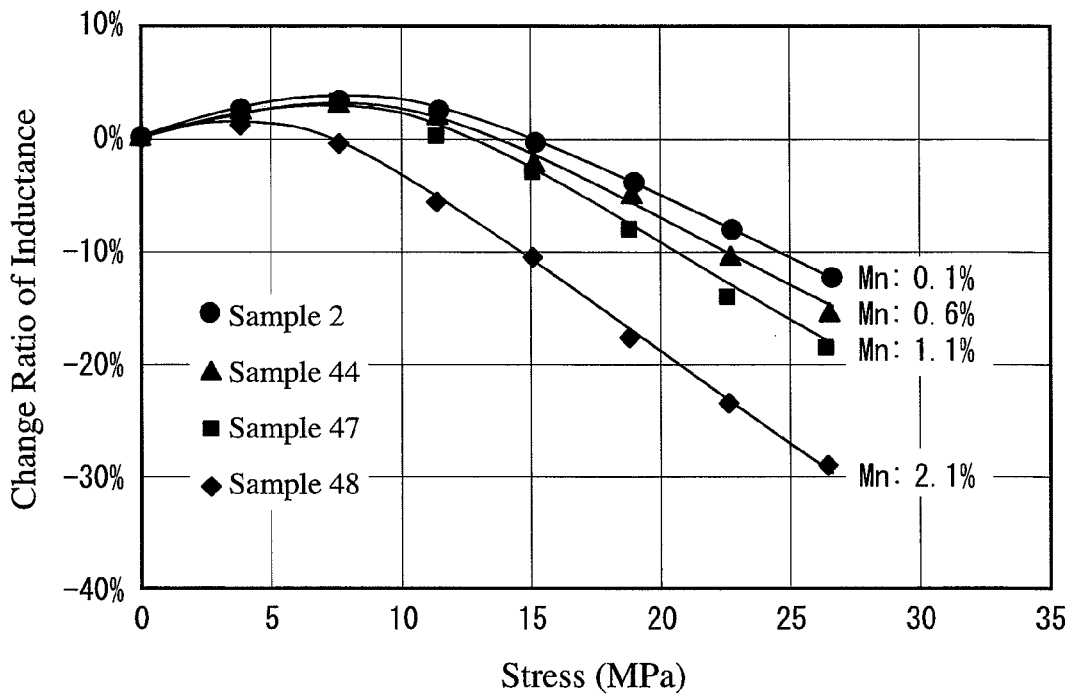
FIG. 4 is a graph showing the change ratio of inductance under stress in low-loss ferrite samples having different Mn contents.
Figure 5:
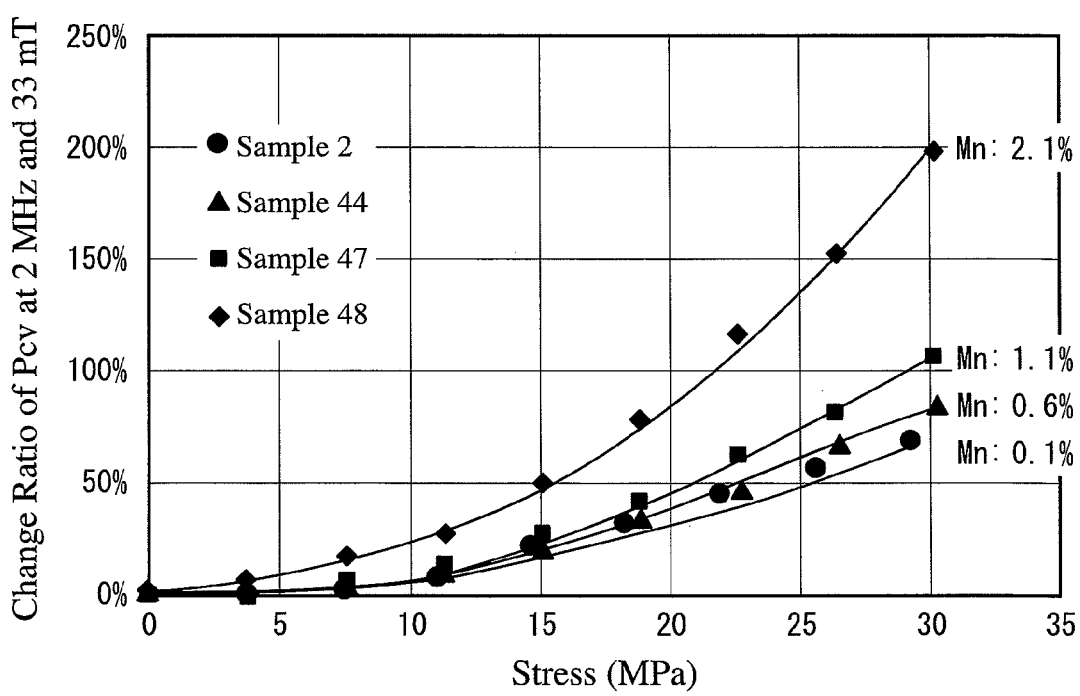
FIG. 5 is a graph showing the change ratio of core loss under stress in low-loss ferrite samples having different Mn contents.

With respect to Samples 2, 44, 47 and 48 containing different amounts of Mn, FIG. 4 shows the stability of inductance under stress, and FIG. 5 shows the stability of core loss under stress. As the amount of Mn increased, the change ratios of inductance and core loss under stress increased. Sample 48 containing 2.1% by mass of $Mn_2O_3$ had poorer stability under stress than those containing no Sn.

EXAMPLE 2

Each ferrite powder of Samples 2, 13 was pulverized together with a binder comprising polyvinyl butyral as a main component and ethanol in a ball mill, and the resultant slurry was applied onto a polyester film by a doctor blade method after the adjustment of viscosity, to form green sheets having dry thickness of 30 μm. Each ferrite green sheet was printed with an Ag paste to form pluralities of conductor coil patterns. If necessary, the green sheet was further printed with a ferrite paste and a non-magnetic paste. Pluralities of green sheets having conductor patterns were pressure-bonded, and the resultant laminate was cut to a post-sintering size of 3.2 mm×1.6 mm×1.0 mm, deprived of the binder, and then sintered at 900° C. for 3 hours in the air. Conductor-pattern-exposing side surfaces of the laminate were printed with an Ag paste, and baked at 600° C. to from external terminals 200a, 200b. Thus, a laminated inductor 10 containing a coil 3 in the laminate 2 was produced. FIG. 1 shows its appearance.

Figure 6:
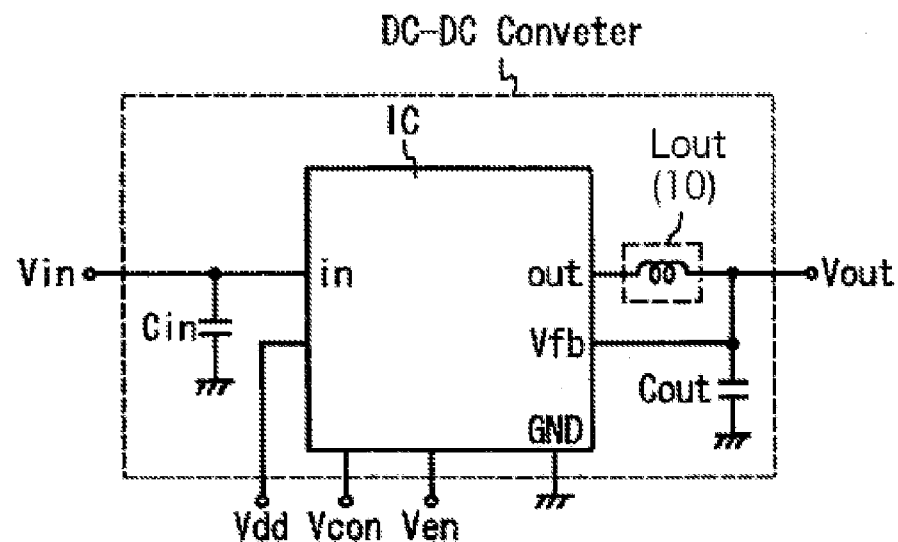
FIG. 6 is a view showing an equivalent circuit of a DC/DC converter.

The laminated inductor 10 was assembled in a step-down DC/DC converter shown in FIG. 6, which had a switching frequency fs of 2 MHz, input voltage Vin of 3.6 V, and output voltage Vout of 1.5 V, to measure DC/DC conversion efficiency. Sample 2 was about 1% higher than Sample 13 in conversion efficiency. Sample 2 has high DC/DC conversion efficiency, presumably because it has low loss and an extremely small change ratio of Pcv under stress.

EFFECT OF THE INVENTION

The low-loss ferrite of the present invention is sinterable at a temperature equal to or lower than 960° C., the melting point of Ag, has low loss at high frequencies of 2 MHz or more, and suffers little variation of characteristics in a wide temperature range even in an environment in which stress and large superimposed DC current are applied. Accordingly, the low-loss ferrite of the present invention is suitable for electronic devices such as laminated inductors, coil-containing laminate substrates, etc.

What is claimed is:

1. Low-loss Ni—Cu—Zn ferrite comprising 100% by mass of main components comprising 47.1-49.3% by mol of $Fe_2O_3$, 20-26% by mol of ZnO, and 6-14% by mol of CuO, the balance being NiO, and comprising, as sub-components, 0.1-2% by mass (as $SnO_2$) of Sn and 0.05-2% by mass (as $Mn_3O_4$) of Mn, and having an average crystal grain size of 0.5-3 μm.

2. The low-loss Ni—Cu—Zn ferrite according to claim 1, which has core loss of 2700 kW/m³ or less at a frequency of 2 MHz and at an operating magnetic flux density Bm of 33 mT, and 430 kW/m³ or less at a frequency of 5 MHz and at an operating magnetic flux density Bm of 10 mT, and saturation magnetic flux density of 390 mT or more in a magnetic field of 4000 A/m.

3. An electronic device comprising a magnetic core made of the low-loss Ni—Cu—Zn ferrite recited in claim 1, and at least one coil wound around said magnetic core.

4. An electronic device comprising an integrally sintered laminate comprising pluralities of ferrite layers made of the low-loss Ni—Cu—Zn ferrite recited in claim 1, and at least one coil formed by Ag-containing electrodes in said laminate.

5. The electronic device according to claim 4, on which a semiconductor device including at least one switch device, and at least one capacitor are mounted, said semiconductor device and said capacitor being mounted on an electrode on the surface of said laminate.

* * * * *